US012777035B2

(12) United States Patent
Freeling et al.

(10) Patent No.: US 12,777,035 B2
(45) Date of Patent: *Oct. 27, 2026

(54) SECURE COMMUNICATIONS VIA THIRD-PARTY SYSTEMS THROUGH FRAMES

(71) Applicant: Wells Fargo Bank, N.A., San Francisco, CA (US)

(72) Inventors: Nathan C. Freeling, Lafayette, CA (US); Imran Haider, San Francisco, CA (US); Ranganathan Kanchi, Danville, CA (US); Andrew-An Truong Luu, Berkeley, CA (US); Nancy Y. Mao, San Francisco, CA (US); Kumaran Perumal, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 19/068,769

(22) Filed: Mar. 3, 2025

(65) Prior Publication Data

US 2025/0202890 A1 Jun. 19, 2025

Related U.S. Application Data

(63) Continuation of application No. 18/220,181, filed on Jul. 10, 2023, now Pat. No. 12,244,587, which is a (Continued)

(51) Int. Cl.

*H04L 9/40* (2022.01)
*G06F 9/54* (2006.01)
(Continued)

(52) U.S. Cl.

CPC .......... *H04L 63/0853* (2013.01); *G06F 9/547* (2013.01); *G06Q 20/401* (2013.01);
(Continued)

(58) Field of Classification Search

CPC . H04L 63/0853; H04L 9/3213; H04L 67/142; H04L 67/51; H04L 67/53;
(Continued)

(56) References Cited

U.S. PATENT DOCUMENTS 1,044,246 A 11/1912 Reid
6,347,306 B1 2/2002 Swart
(Continued)

FOREIGN PATENT DOCUMENTS

WO WO-2010/085370 A2 7/2010
WO WO-2017/160877 A1 9/2017
WO WO-2017/181185 A1 10/2017

OTHER PUBLICATIONS

Zachariadis, Markos and Ozcan, Pinar, "The API Economy and Digital Transformation in Financial Services: the Case of Open Banking," 2017, 28 pages.
(Continued)

*Primary Examiner* — Darren B Schwartz
(74) *Attorney, Agent, or Firm* — Foley & Lardner LLP

(57) ABSTRACT

Disclosed are methods, systems, and devices for facilitating secure and private communications, via a website or application of a third-party computing system (TPCS), between a user device and a service provider computing system (SPCS). The communications may be conducted via a frame in a website served by the TPCS. The TPCS may serve a website that incorporates a customizable SDK component provided by the SPCS. The communications allow the user to, for example, open a new account. The SDK component may be initialized via a script from the SPCS, and authen-
(Continued)

ticated via a session token obtained from the SPCS via the TPCS. The SDK component may provide user information, input into the frame, to the SPCS via API calls to the SPCS. The user does not navigate away from the website while securely engaging the SPCS. The third-party/partner need not develop its own user interface, security protocols, etc.

19 Claims, 9 Drawing Sheets

Related U.S. Application Data continuation of application No. 17/343,455, filed on Jun. 9, 2021, now Pat. No. 11,700,248, which is a continuation of application No. 16/448,916, filed on Jun. 21, 2019, now Pat. No. 11,044,246.

(51) Int. Cl.

*G06Q 20/02* (2012.01)
*G06Q 20/40* (2012.01)
*G06Q 30/0601* (2023.01)
*H04L 9/32* (2006.01)
*H04L 67/02* (2022.01)
*H04L 67/142* (2022.01)
*H04L 67/51* (2022.01)
*H04L 67/53* (2022.01)

(52) U.S. Cl.

CPC ..... *G06Q 30/0601* (2013.01); *G06Q 30/0613* (2013.01); *H04L 9/3213* (2013.01); *H04L 67/142* (2013.01); *H04L 67/51* (2022.05)

(58) Field of Classification Search

CPC . H04L 2209/56; H04L 63/0807; H04L 67/02; G06F 9/547; G06Q 20/401; G06Q 30/0601; G06Q 30/0613; G06Q 20/02; G06Q 20/027

See application file for complete search history.

(56) References Cited

U.S. PATENT DOCUMENTS 6,721,776 B1 4/2004 Erickson et al.
6,957,199 B1 10/2005 Fisher
7,249,097 B2 7/2007 Hutchison et al.
7,356,506 B2 4/2008 Watson et al.
7,444,676 B1 10/2008 Asghari-Kamrani et al.
7,523,068 B2 4/2009 Britney et al.
7,536,326 B2 5/2009 Tyson-Quah
7,610,233 B1 10/2009 Leong et al.
7,725,875 B2 5/2010 Waldrep
7,729,994 B2 6/2010 Gupta et al.
7,831,521 B1 11/2010 Ball et al.
7,870,078 B2 1/2011 Clark et al.
7,890,393 B2 2/2011 Talbert et al.
8,301,500 B2 10/2012 Pharris
8,352,323 B2 1/2013 Fisher
8,352,370 B1 1/2013 White et al.
8,412,625 B2 4/2013 Pilo'
8,423,456 B2 4/2013 Egnatios et al.
8,447,630 B2 5/2013 O'Brien et al.
8,452,708 B1 5/2013 Birenbaum et al.
8,453,925 B2 6/2013 Fisher et al.
8,527,408 B2 9/2013 Campbell et al.
8,606,670 B2 12/2013 Patton
8,745,194 B2 6/2014 Uribe-Etxebarria Jimenez
8,818,870 B2 8/2014 Fisher
8,838,503 B2 9/2014 Pelegero
9,135,618 B1 9/2015 Dorsey et al.
9,172,693 B2 10/2015 Griffin et al.
9,219,736 B1 12/2015 Lewis et al.
9,225,707 B1 12/2015 De Sousa et al.
9,235,839 B2 1/2016 Dua
9,378,356 B2 6/2016 Rockwell
9,412,132 B2 8/2016 Keithley
9,471,913 B1 10/2016 Kaptcan et al.
9,479,491 B1 10/2016 Farnsworth et al.
9,495,699 B2 11/2016 Mangaru et al.
9,525,690 B2 12/2016 Burgess et al.
9,542,673 B2 1/2017 Tanner et al.
9,589,268 B2 3/2017 Hammad
9,633,341 B2 4/2017 Kim et al.
9,646,297 B2 5/2017 Van Den Broeck et al.
9,665,854 B1 5/2017 Burger et al.
9,705,999 B1 7/2017 Lewis et al.
9,760,871 B1 9/2017 Pourfallah et al.
9,779,436 B2 10/2017 Bui
9,830,606 B2 11/2017 Boncimino
9,846,872 B2 12/2017 Hogg et al.
9,876,803 B2 1/2018 Miu et al.
9,892,386 B2 2/2018 Liberty
9,922,381 B2 3/2018 Isaacson et al.
9,990,621 B1 6/2018 Ng et al.
10,055,740 B2 8/2018 Hanson et al.
10,062,072 B2 8/2018 Davis et al.
10,062,073 B2 8/2018 Baldie
10,068,295 B1 9/2018 Allen
10,073,953 B2 9/2018 Xing
10,083,427 B2 9/2018 Cummins et al.
10,089,617 B2 10/2018 Royyuru et al.
10,121,129 B2 11/2018 Kalgi
10,121,133 B2 11/2018 Nelms et al.
10,127,528 B2 11/2018 Solis
10,127,549 B2 11/2018 Keresman et al.
10,148,659 B2 12/2018 Nandakumar
10,157,375 B2 12/2018 Balasubramanian et al.
10,163,086 B2 12/2018 Keresman et al.
10,181,119 B2 1/2019 Cyr et al.
10,181,162 B2 1/2019 Drury et al.
10,185,954 B2 1/2019 Mizhen et al.
10,210,345 B2 2/2019 Beye et al.
10,210,514 B2 2/2019 Musser et al.
10,217,102 B2 2/2019 Pitroda et al.
10,354,240 B2 7/2019 Purves et al.
10,362,010 B2 7/2019 Sharp et al.
10,438,176 B2 10/2019 Johnson et al.
10,467,689 B2 11/2019 Chen
10,505,925 B1 * 12/2019 Doloff ................... H04L 63/083
10,510,082 B1 12/2019 Zimmerman et al.
10,552,442 B1 * 2/2020 Lusk ....................... G06F 21/62
10,621,658 B1 4/2020 Sahni et al.
10,708,054 B2 7/2020 Donaldson et al.
11,044,092 B1 6/2021 Freeling et al.
11,044,246 B1 6/2021 Freeling et al.
11,050,565 B1 6/2021 Freeling et al.
11,063,926 B1 7/2021 Narayanan et al.
11,093,912 B1 8/2021 Fakhraie et al.
11,354,673 B1 6/2022 Brock
11,429,971 B1 8/2022 Ouellette et al.
11,695,560 B1 7/2023 Freeling et al.
11,700,122 B1 7/2023 Freeling et al.
11,700,248 B1 7/2023 Freeling et al.
2002/0181710 A1 12/2002 Adam et al.
2004/0177047 A1 9/2004 Graves et al.
2005/0262026 A1 11/2005 Watkins
2006/0020783 A1 1/2006 Fisher
2006/0059569 A1 3/2006 Dasgupta et al.
2006/0129896 A1 6/2006 Rohn
2006/0277128 A1 12/2006 Anandarao et al.
2007/0240166 A1 10/2007 Marappan
2007/0271149 A1 11/2007 Siegel et al.
2007/0288377 A1 12/2007 Shaked
2008/0052183 A1 2/2008 Hobson et al.
2008/0086417 A1 4/2008 Bykov et al.
2008/0120235 A1 5/2008 Chu
2008/0167944 A1 7/2008 Keithley et al.
2008/0183593 A1 7/2008 Dierks
2008/0288405 A1 11/2008 John
2008/0301022 A1 12/2008 Patel et al.
2009/0043667 A1 2/2009 Deyoe et al.

(56) References Cited

U.S. PATENT DOCUMENTS

2009/0076934 A1 3/2009 Shahbazi et al.
2009/0089190 A1 4/2009 Girulat, Jr.
2009/0249448 A1 10/2009 Choi et al.
2009/0259560 A1 10/2009 Bachenheimer
2009/0320106 A1 12/2009 Jones et al.
2010/0094719 A1 4/2010 Sines et al.
2010/0100454 A1 4/2010 Sines et al.
2010/0169223 A1 7/2010 Yuan
2010/0223184 A1 9/2010 Perlman
2010/0251144 A1* 9/2010 Shaty ...................... H04L 67/53 709/217
2011/0137804 A1 6/2011 Peterson
2011/0270751 A1 11/2011 Csinger et al.
2012/0018506 A1 1/2012 Hammad et al.
2012/0089481 A1* 4/2012 Iozzia ...................... H04N 7/16 726/5
2012/0198535 A1 8/2012 Oberheide et al.
2013/0013512 A1 1/2013 Cloud et al.
2013/0103578 A1 4/2013 Mallean et al.
2013/0117832 A1 5/2013 Gandhi et al.
2013/0179957 A1 7/2013 Takata et al.
2013/0198066 A1 8/2013 Wall et al.
2013/0276078 A1 10/2013 Rockwell
2013/0282588 A1 10/2013 Hruska
2013/0318348 A1* 11/2013 Lebron ............... H04L 63/0428 713/168
2013/0339231 A1 12/2013 Chaitanya
2013/0346302 A1 12/2013 Purves et al.
2014/0012701 A1 1/2014 Wall et al.
2014/0032707 A1* 1/2014 Doshi .................... G06F 9/542 709/217
2014/0058927 A1 2/2014 Schwarzkopf
2014/0129435 A1 5/2014 Pardo et al.
2014/0165156 A1 6/2014 Fushman et al.
2014/0201083 A1 7/2014 Nowack et al.
2014/0223578 A1 8/2014 Ross
2014/0256425 A1 9/2014 Flaherty
2014/0258046 A1 9/2014 Wendling et al.
2014/0258136 A1 9/2014 Ellis
2014/0279546 A1 9/2014 Poole et al.
2014/0307735 A1 10/2014 Lerner
2014/0324690 A1 10/2014 Allen et al.
2014/0359722 A1 12/2014 Schultz et al.
2015/0019423 A1 1/2015 Dowling et al.
2015/0026061 A1 1/2015 Siegel et al.
2015/0039452 A1 2/2015 Barve et al.
2015/0052005 A1 2/2015 Howe
2015/0058931 A1 2/2015 Miu et al.
2015/0074407 A1 3/2015 Palmeri et al.
2015/0074783 A1 3/2015 Clothier et al.
2015/0089409 A1 3/2015 Asseily et al.
2015/0089615 A1 3/2015 Krawczyk et al.
2015/0121462 A1 4/2015 Courage et al.
2015/0154588 A1 6/2015 Purves et al.
2015/0161608 A1 6/2015 Gilbert et al.
2015/0188900 A1 7/2015 Charbonneau et al.
2015/0188915 A1 7/2015 Li
2015/0242834 A1 8/2015 Goldsmith et al.
2015/0242949 A1 8/2015 Phillips, IV
2015/0254638 A1 9/2015 Bondesen et al.
2015/0278811 A1 10/2015 Lalchandani et al.
2015/0310497 A1 10/2015 Valin et al.
2015/0363581 A1 12/2015 Ranadive et al.
2015/0371226 A1 12/2015 Hurley et al.
2016/0005113 A1 1/2016 Mendez et al.
2016/0012465 A1 1/2016 Sharp
2016/0019536 A1 1/2016 Ortiz et al.
2016/0034900 A1 2/2016 Nelsen et al.
2016/0065563 A1* 3/2016 Broadbent .......... H04L 63/0281 726/9
2016/0132877 A1 5/2016 Carrott
2016/0155160 A1 6/2016 Walz et al.
2016/0189145 A1 6/2016 William
2016/0239840 A1 8/2016 Preibisch
2016/0267449 A1 9/2016 Forzley
2017/0004719 A1 1/2017 Laud et al.
2017/0024716 A1 1/2017 Jiam et al.
2017/0070500 A1 3/2017 Hockey et al.
2017/0076274 A1 3/2017 Royyuru et al.
2017/0116615 A1 4/2017 Burgess et al.
2017/0126649 A1 5/2017 Votaw et al.
2017/0149790 A1* 5/2017 Yamamoto .......... H04L 63/0807
2017/0180960 A1 6/2017 Drake
2017/0286281 A1 10/2017 Dahan
2017/0286958 A1 10/2017 Herman
2017/0289140 A1 10/2017 Cai et al.
2017/0289809 A1 10/2017 Smith
2017/0308880 A1 10/2017 Phillips et al.
2017/0310771 A1 10/2017 Lewis et al.
2017/0351514 A1 12/2017 Chou et al.
2017/0372275 A1 12/2017 Sigmund
2018/0025333 A1 1/2018 Cunningham
2018/0060965 A1 3/2018 Kumar
2018/0068312 A1 3/2018 Kim et al.
2018/0121896 A1 5/2018 Potadar
2018/0130051 A1 5/2018 Matthews et al.
2018/0139109 A1 5/2018 Zuerner
2018/0150823 A1 5/2018 Omojola et al.
2018/0150826 A1 5/2018 Schwartz et al.
2018/0165659 A1 6/2018 Raouda El-Balah
2018/0189777 A1 7/2018 Grassadonia et al.
2018/0189778 A1 7/2018 Grassadonia et al.
2018/0198845 A1 7/2018 Kulp et al.
2018/0225789 A1 8/2018 Cook
2018/0240095 A1 8/2018 Buckley et al.
2018/0247654 A1 8/2018 Bhaya et al.
2018/0253727 A1 9/2018 Ortiz et al.
2018/0267847 A1 9/2018 Smith et al.
2018/0276053 A1 9/2018 Kesavan et al.
2018/0315024 A1 11/2018 Rauch et al.
2018/0349891 A1 12/2018 Putre et al.
2019/0005467 A1 1/2019 Varagani et al.
2019/0012646 A1 1/2019 Seidl et al.
2019/0034393 A1 1/2019 Rose
2019/0043138 A1 2/2019 Blake et al.
2019/0050845 A1 2/2019 Deshmukh et al.
2019/0058707 A1 2/2019 Chung et al.
2019/0066090 A1 2/2019 Mei et al.
2019/0087809 A1 3/2019 Bloy et al.
2019/0087894 A1 3/2019 Bloy et al.
2019/0096005 A1 3/2019 Drury et al.
2019/0130750 A1 5/2019 Cole et al.
2019/0205851 A1 7/2019 Sinha et al.
2019/0244263 A1 8/2019 Nelson et al.
2019/0281051 A1 9/2019 Burmester et al.
2019/0303910 A1 10/2019 Asbe et al.
2019/0312746 A1 10/2019 Myers et al.
2019/0318122 A1 10/2019 Hockey et al.
2020/0053061 A1 2/2020 Cambou
2020/0076813 A1 3/2020 Felice-Steele et al.
2020/0092108 A1 3/2020 Lyu
2020/0092272 A1 3/2020 Eisen et al.
2020/0118205 A1 4/2020 Bloy et al.
2020/0366484 A1 11/2020 So
2021/0224767 A1 7/2021 Devan et al.
2022/0277306 A1 9/2022 Levitt et al.

OTHER PUBLICATIONS

Apple, Press Release, "Apple Pay Cash and person to person payments now available," Dec. 5, 2017, available at https:// www.apple.com/newsroom/2017 /12/apple-pay-cash-and-person-to-person-payments-now-available/ [retrieved on Mar. 6, 2023] ( Year: 2017).

Authentication and Access to Financial Institution Services and System, Aug. 11, 2021, Federal Financial Institution Examination Council. (Year: 2021).

Bonneau, Joseph and Soren Preibusch. "The Password Thicket: Technical and Market Failures in Human Authentication on the Web." The Ninth Workshop on the Economics of Information Security. Weis. 2010. (Year: 2010).

(56) References Cited

OTHER PUBLICATIONS

Byambajav, Dolgorsuren; "Secure NFC enabled mobile phone payments using elliptic curve cryptography"; California State University, Aug. 2011. (Year: 2011).
Faravelon, A et al., "Privacy conscious web apps composition," 2014 IEEE Eighth International Conference on Research Challenges in Information Science (RCIS), Marrakech, Morocco, 2014, pp. 1-12, doi: 10.1109/RCIS.2014.686 (Year: 2014).
Lazarick, R., Multibiometric Techniques and Standards Activities (2005).
Subhashree Samal and Swarna Prabha Jena, "Research on the Development of a New Shop Application Using Android," Mar. 2014, International Journal of Advance Computer Research, vol. 4, No. 1 Issue Mar. 14, 2014, pp. 236-241 (Year: 2014).
Subhashree Samal/Swarna Prabha Jena, Research on the Development of a New Shop Application Using Android, Mar. 2012, Internal Journal of Advanced Computer Research, vol. 4, No. 1 Issue Mar. 14, 2014, pp. 236-241 (Year: 2014).
Tiwari, Ayu • Sanyal, Sudip • Abraham, Ajith • Knapskog, Svein Johan• Sanyal, Sugata, A Mul Ti-Factor Security Protocol for Wireless Payment—Secure Web Authentication Using Mobile Devices, Nov. 13, 2011, p. 4 ( Year: 2011) (Year: 2011).
Using Haptic Interfaces for User Verification in Virtual Environments Orozco (Year: 2008).
V. Toubiana, V. Verdot, G. Burnside and E. Joubert, "R2M: a Reputation Model for Mashups," 2010 7th IEEE Consumer Communications and Networking Conference, 2010, pp. 1-6, doi: 10.1109/CCNC.2010.5421609. (Year: 2010).
Wells Fargo Bank NA Granted Patent for Identity Verification Services with Identity Score Through External Entities via Application Programming Interface Global IP News. Banking Patent News [New Delhi] Apr. 14, 2020. (Year: 2020).
Zachariadis, M., et al. The API economy and digital transformation in financial services: the case of open banking. SWIFT Institute Working Paper No. 2016-001. Jun. 15, 2017. (Year: 2017).

* cited by examiner

400

500

SECURE COMMUNICATIONS VIA THIRD-PARTY SYSTEMS THROUGH FRAMES

CROSS-REFERENCE TO RELATED PATENT APPLICATIONS

This application is a continuation of U.S. patent application Ser. No. 18/220,181 filed Jul. 10, 2023, which is a continuation of U.S. patent application Ser. No. 17/343,455 filed Jun. 9, 2021, which is a continuation of U.S. patent application Ser. No. 16/448,916 filed Jun. 21, 2019, the disclosure of each of which is incorporated herein by reference.

TECHNICAL FIELD

The present disclosure relates generally to allowing a user to communicate securely with a first entity via a website or application of a second entity through, for example, an authenticated frame in the website, and to allowing a user, for example, to virtually seamlessly and securely open an account with one entity while using a website or application of another entity.

BACKGROUND

A user who is engaged in a first communications session with a first computing system via a website served by the first computing system may wish to communicate, securely and privately, with a second computing system to acquire information or otherwise perform an action that is relevant to the communications with the first computing system. For example, a user may wish to procure an item via the first computing system using an account opened via the second computing system. In such a case, the user may initiate a second, separate communication with the second computing system via a website or application provided by the second computing system. The user may, for example, apply for an account during the second communications session. But this is problematic for multiple reasons. For example, while the user applies for the account or otherwise communicates with the second computing system, the first communications session may time out or be terminated by the first computing system. If this occurs, the user needs to reconnect with the first computing system (e.g., initiate another communications session at the website served by the first computing system), involving additional steps such as authentication, navigation, etc. The user may need to again enter the same or similar information and make the same or similar selections as before to reach the point at which the user decided to engage with the second computing system. Also, once the user has acquired the information or performed the action during the second communications session, the user would need to return to the website served by the first computing system and, for example, enter the information acquired from the second computing system or indicate to the first computing system that a process has been completed or an action has been performed. Alternating between websites or applications can be cumbersome and time consuming for the user, and may discourage the user from continuing with, returning to, or restarting communications with the first computing system.

To facilitate such a process, and thereby make it less cumbersome for the user and reduce the likelihood the user will choose not to continue engaging with the first computing system, the first computing system may serve as intermediary for communication between the user and the second computing system. That is, the first computing system may relay information between the user and the second computing system. But having the first computing system act as intermediary would require the first computing system to be responsible for security, and the first computing system may not be equipped to ensure the security (e.g., authentication, suitable encryption, etc.) warranted by the nature of the communications. Also, the communications would not be private, and the user's personal information would be revealed to the first computing system, which likely does not need or desire the personal information. Moreover, from the perspective of the first computing system, if the first computing system is to allow the user to communicate with the second computing system, the website served by the first computing system must incorporate a suitable mechanism (e.g., user interfaces (UI), communications protocols, etc.) to facilitate the secure exchange of information between the user and the second computing system, requiring additional computing resources that otherwise would not be needed by the first computing system.

SUMMARY

Various embodiments of the disclosure relate to method which can be implemented by a third-party (partner) computing system. The method may comprise presenting information to a user device via a website and/or via an application. The website and/or application may incorporate a software development kit (SDK) component, which may have been provided by or via a service provider computing system. The SDK component, which may have been received as part of an SDK, may provide tools that facilitate secure and private communication between a user device and the service provider computing system. The method may comprise accepting a request for an SDK session token. The SDK session token request may be received from or via the SDK component. Alternatively or additionally, the SDK session token request may be received from or via the website and/or from or via the application. The request may be an HTTP request. The SDK component may generate the HTTP request in response to a user input submitted to the website and/or to the application. The user input submitted to the website and/or application may indicate a request of the user to transact with the service provider computing system to, for example, request a new account. The method may comprise transmitting an authentication API call to the service provider computing system to request the SDK session token. The method may comprise receiving the SDK session token. The SDK session token may be received from or via the service provider computing system. The SDK session token may be received in response to the authentication API call. The method may comprise transmitting the SDK session token to the SDK component. Alternatively or additionally, the SDK session may be transmitted to the website and/or to the application. The SDK session token may be for use by the SDK component. The SDK session token may be transmitted to the SDK component to enable authenticated communications directly between the SDK component and the service provider computing system.

In one or more implementations, the SDK component may facilitate authenticated private communications between the user device and the service provider computing system via a frame in the website. The frame may be an inline frame ("iframe") in the website. The iframe may utilize, in part, an HTML <iframe> tag. The SDK component may maintain privacy at least in part by not sharing user entries into the inline frame with either the website or the partner computing system. User entries may be input into, for example, fields in a form presented in the frame to a user of the user device.

In one or more implementations, the website and/or application initializes the SDK component at least in part by retrieving and executing a script. The script may be received from or via the service provider computing system. Alternatively or additionally, the script may be received from or via the partner computing system. The website, the application, and/or the partner computing system may transmit a script request to the service provider computing system. Additionally or alternatively, the website and/or the application may transmit a script request to the partner computing system. The script may be received by the website, the application, and/or the partner computing system in response to the script request.

In one or more implementations, the website may be an ecommerce website. The method may comprise accepting via the website an identification of one or more items selected by the user. The user input submitted to the website may indicate a request to open a new account via the service provider computing system for use in purchasing the one or more items selected via the website.

In one or more implementations, the SDK component may run on the user device once the SDK component is initialized by the website. The SDK component may be initialized upon execution of a script. The script may be retrieved from or via the service provider computing system. The script may be retrieved by or via the website and/or the application.

In one or more implementations, the website and/or the application initializes the SDK component at least in part by retrieving and executing a script from or via the service provider computing system.

In one or more implementations, the method may comprise accepting an application ID. The application ID may be received from or via the SDK component. The method may comprise transmitting a servicing API call to the service provider computing system. The servicing API call may include the application ID. The application ID may be associated with an account request submitted to the service provider computing system. The account request may be a request to open a new account, such as a financial account. The account request may be submitted via the SDK component. The SDK component may make API calls to the service provider computing system to provide the service provider computing system with user entries into fields in the account request. The fields may be part of a form used to apply for a new account.

In one or more implementations, the method may comprise receiving an account number from the service provider computing system. The account number may be received in response to a servicing API call. The servicing API call may have been transmitted to the service provider computing by or via the partner computing system. Alternatively or additionally, the servicing API call may have been transmitted to the service provider computing by or via the SDK component, the website, and/or the application running on the user device. In one or more implementations, the partner computing system may be administered by an online merchant. The account number may be a credit card account number. The method may comprise charging a purchase by the user to the credit card.

In one or more implementations, the method may comprise receiving the SDK component from the service provider computing system. The method may comprise incorporating the SDK component in the website and/or the application. The SDK component may facilitate the authenticated private communications via a frame in the website and/or the application. The SDK component may be configured to permit customization of the frame. The method may comprise accepting one or more user customizations of the frame. The customizations may be submitted via a user of the partner computing system. The one or more user customizations may comprise selections of third-party elements to be presented in the frame.

Various embodiments of the disclosure relate to a method implemented by a partner computing system. The method may comprise receiving an SDK component. The SDK component may be received from or via a service provider computing system. The SDK component may be part of an SDK. The SDK component may incorporate into a website and/or an application. The SDK component may facilitate secure communication between a user device and the service provider computing system. The secure communications may be conducted via a frame in the website and/or application. The method may comprise accepting one or more user selections customizing the frame. The method may comprise incorporating the customized SDK component in the website and/or application. The method may comprise presenting information to the user device via the website and/or application incorporating the SDK component. The method may comprise accepting a request for an SDK session token. The request for the SDK session token may be received from or via the SDK component. The request for the SDK session token may be received in response to a user input submitted via the website and/or application. The user input submitted to the website and/or application may indicate a request to transact with the service provider computing system to, for example, open a new account. The method may comprise obtaining the SDK session token from the service provider computing system. The SDK session token may be received via an authentication API call transmitted to the service provider computing system to request the SDK session token. The method may comprise transmitting the SDK session token to the SDK component to allow the user to have authenticated private communications with the service provider computing system. The communications between the user device and the service provider computing system may be via an inline frame in the website and/or application.

In one or more implementations, the website and/or application is an ecommerce website or application. The method may comprise accepting via the website or application an identification of one or more items selected by the user. The method may comprise receiving an application ID from the SDK component. The method may comprise making an API call to the service provider computing system. The API call may include the application ID. The method may comprise receiving a credit card number from the service provider computing system. The credit card number may be received in response to the API call. The method may comprise charging the one or more selected items to the credit card.

In one or more implementations, the method may comprise accepting, from the SDK component, an application ID. The method may comprise transmitting a servicing API call to the service provider computing system. The servicing API call may include the application ID. The method may comprise receiving an account number from the service provider computing system. The account number may be received in response to the servicing API call. The partner computing system may be administered by an online merchant. The account number may be a credit card account number. The method may comprise charging a purchase by the user to the credit card.

In one or more implementations, the one or more user customizations comprise selections of third-party elements to be presented in the inline frame.

Various embodiments of the disclosure relate to a partner computing system comprising a network interface configured to communicate via a telecommunications network. The partner computing system may comprise a processor and a memory having stored thereon instructions that, when executed by the processor, cause the processor to perform specific functions. The instructions may cause the processor to present information to a user device. The information may be presented via a website or application. The website or application may incorporate an SDK component provided by a service provider computing system to facilitate secure and private communication between a user device and the service provider computing system. The instructions may cause the processor to accept a request for an SDK session token. The request may be received from or via the SDK component. The request may be an HTTP request. The SDK component may generate the request in response to a user input submitted to the website or application. The user input may indicate a request to transact with the service provider computing system to, for example, open a new account. The instructions may cause the processor to transmit an authentication API call to the service provider computing system to request the SDK session token. The instructions may cause the processor to receive the SDK session token from or via the service provider computing system. The SDK session token may be received in response to the authentication API call. The instructions may cause the processor to transmit the SDK session token to the SDK component to enable authenticated communications directly between the SDK component and the service provider computing system.

Various embodiments of the disclosure relate to a method implemented by a user device. The method may comprise presenting a website served by a third-party computing system to provide a user with access to information from the third-party computing system. The website may be presented via one or more user interfaces configured to receive inputs from the user and provide outputs to the user. The method may comprise accepting a first user input indicating the user wishes to apply for a new account via a service provider computing system. The first user input may be received via the one or more user interfaces. The method may comprise transmitting to the service provider computing system a request for a script. The method may comprise receiving the script from or via the service provider computing system. The script may be received in response to the request. The method may comprise executing the script to initialize an SDK component that is incorporated in the website. The method may comprise transmitting to the third-party computing system a request for an SDK session token to be obtained from the service provider computing system. The request for the SDK session token may be submitted via the SDK component. The method may comprise receiving the SDK session token. The SDK session token may be received by or via the SDK component. The SDK session token may be received from the third-party computing system and/or from the service provider computing system. The method may comprise using the SDK session token for authenticated private communications between the user device and the service provider computing system.

In one or more implementations, the authenticated private communications may be conducted via a frame in the website. Privacy may be maintained by the SDK component sharing user entries submitted in the frame with neither the website nor the third-party computing system.

In one or more implementations, the method may comprise accepting a set of user inputs entered via the one or more user interfaces for applying for the new account. The user inputs may be entered as part of the authenticated private communications.

In one or more implementations, the method may comprise making origination API calls to the service provider computing system. The SDK component may make the origination API calls to the service provider computing system to submit user information, received via the one or more user interfaces, to the service provider computing system. The user information may be submitted as part of an application for the new account.

In one or more implementations, the private communications may be direct communications between the SDK component and the service provider computing system.

In one or more implementations, the method may comprise transmitting an application ID to the third-party computing system. The application ID may uniquely identify the user's application for the new account.

In one or more implementations, the website may be an ecommerce website. The method may comprise accepting, via the one or more user interfaces, one or more selections of one or more items to be purchased. The method may comprise accepting confirmation that the user wishes to charge the one or more items to the new account opened via secure and private communications with the service provider computing system.

Various embodiments of the disclosure relate to a method implemented by a service provider computing system. The method may involve the service provider computing system securely and privately communicating with a user device via a third-party computing system. The method may comprise accepting a request for an initialization script. The request for the initialization script may be received from or via a website accessed using the user device. The script may be configured, when executed by the website, to initialize an SDK component incorporated in the website. The method may comprise transmitting the initialization script to the user device. The initialization script may be transmitted in response to receiving the request. The method may comprise receiving an SDK authentication API call from the third-party computing system. The SDK authentication API call may be received via an API gateway of the service provider computing system. The SDK authentication API call may request an SDK session token. The method may comprise transmitting the SDK session token to the third-party computing system. The SDK session token may be transmitted in response to the SDK authentication API call. The method may comprise accepting one or more origination API calls from the SDK component running on the user device. The origination API calls may be received via the API gateway of the service provider computing system. One or more origination API calls may include user data input into the user device as part of a request for a new user account to be opened by the service provider computing system. The method may comprise transmitting to the SDK component a response indicating whether the request for the new user account is approved. The response may be transmitted in response to or following the origination API calls.

In one or more implementations, the method may comprise accepting a servicing API call from the third-party computing system. The servicing API call may be accepted via the API gateway. The servicing API call may request information regarding the new user account. The servicing API call may request an account number for the new user account. The new user account may be a credit card. The account number may be a credit card account number.

In one or more implementations, the method may comprise transmitting the account number to the third-party computing system. The account number may be transmitted in response to receiving the servicing API call.

In one or more implementations, the method may comprise accepting a request to use the new user account in a transaction. The request may be received from the third-party computing system.

In one or more implementations, the transaction may be a purchase by a user of the user device of one or more items presented by the third-party computing system via the website. The new account may be a credit card. The method may comprise charging the purchase to the credit card.

Various embodiments of the disclosure relate to a user device. The user device may comprise a network interface configured to communicate via a telecommunications network. The user device may comprise one or more user interfaces for receiving inputs from a user and providing outputs to the user. The device may comprise a processor and a memory having stored thereon instructions that, when executed by the processor, cause the processor to perform specific functions. The instructions may cause the processor to present, via the one or more user interfaces, a website served by a third-party computing system to provide the user with access to information from the third-party computing system. The instructions may cause the processor to accept, via the one or more user interfaces, a first user input indicating the user wishes to apply for a new account via a service provider computing system. The instructions may cause the processor to transmit to the service provider computing system and/or to the third-party computing system a request for a script. The instructions may cause the processor to receive the script from or via the service provider computing system and/or the third-party computing system. The script may be received in response to the request. The instructions may cause the processor to execute the script to initialize an SDK component that is incorporated in the website. The instructions may cause the processor to transmit to the third-party computing system a request for an SDK session token to be obtained from or via the service provider computing system. Alternatively or additionally, the instructions may cause the processor to transmit the request for the SDK session token to the service provider computing system. The request may be transmitted via the SDK component. The instructions may cause the processor to receive the SDK session token. The SDK session token may be received from or via the third-party computing system and/or the service provider computing system. The instructions may cause the processor to use the SDK session token for authenticated private communications between user device and the service provider computing system.

Various embodiments of the disclosure relate to a method implemented via a computing system of a service provider. The method may be for opening a new account via a website. The website may be served by a third-party computing system to a user device. The method may comprise receiving an SDK authentication API call from the third-party computing system. The SDK authentication API call may be received via an API gateway. The SDK authentication API call may request an SDK session token. The method may comprise transmitting the SDK session token to the third-party computing system. The SDK session token may be transmitted in response to the SDK authentication API call. The method may comprise accepting from the user device one or more origination API calls. The one or more origination API calls may be accepted via the API gateway. The origination API calls may include user data input by a user into the user device. The method may comprise approving a new account for the user based on the user data accepted via the origination API calls. The method may comprise transmitting to the user device a response indicating the new user account is approved. The response may be transmitted to the user device in response to the origination API calls.

In one or more implementations, transmitting the response to the user device may comprise transmitting the response to an SDK component incorporated in the website.

In one or more implementations, the new account may be opened without directing the user to a second website or application of the service provider.

In one or more implementations, opening of the new account may be not based on user data that is received via a second website or application of the service provider. Opening of the new account may be not based on user data that is received via a second website or application of the service provider after the SDK authentication API call from the third-party computing system.

In one or more implementations, the method may comprise accepting from the third-party computing system a servicing API call. The servicing API call may request information regarding the new account. The servicing API call may be accepted via the API gateway.

In one or more implementations, the servicing API call may request an account number for the new account.

In one or more implementations, the new account is a credit card. The account number may be a credit card account number.

In one or more implementations, the method may comprise transmitting the account number to the third-party computing system. The account number may be transmitted in response to receiving the servicing API call.

In one or more implementations, the method may comprise accepting a request to use the new account in a transaction. The request may be accepted from the third-party computing system.

In one or more implementations, the transaction may be a purchase by the user of the user device. The purchase may be of one or more items presented by the third-party computing system via the website.

In one or more implementations, the new account may be a credit card. The method may comprise charging the purchase to the credit card.

In one or more implementations, the method may comprise accepting a request for an initialization script. The request may be accepted via the website. The script, when executed by the website, may initialize an SDK component incorporated in the website.

In one or more implementations, the method may comprise transmitting the initialization script to the user device. The initialization script may be transmitted in response to receiving the request.

Various embodiments of the disclosure relate to a method implemented by a computing system of a service provider. The method may be for opening a new account via a website. The website may be served by a third-party computing system to a user device. The method may comprise receiving a request for a session token. The request for the session token may be received from the third-party computing system. The method may comprise transmitting the session token to the third-party computing system. The session token may be transmitted in response to the request. The method may comprise accepting from the user device user data input into the user device. The user data may be accepted via a frame in the third-party website. The method may comprise opening a new account for the user. The new account may be opened based on the user data accepted via the frame in the website. The method may comprise transmitting a response indicating the new account has been opened. The response indicating the new account has been opened may be transmitted to the user device and/or to the third-party computing system.

In one or more implementations, the frame is an inline frame.

In one or more implementations, receiving the request from the third-party computing system may comprise receiving an SDK authentication API call requesting an SDK session token. The SDK authentication API call may be received via an API gateway.

In one or more implementations, accepting the user data via the frame may comprise accepting one or more origination API calls from the user device.

In one or more implementations, the new account may be opened without directing the user to a second website or application of the service provider.

In one or more implementations, opening of the new account may be not based on user data that is received via a second website or application of the service provider. Opening of the new account may be not based on user data that is received via a second website or application of the service provider after the request for the session token is received from the third-party computing system.

Various embodiments of the disclosure relate to a method implemented via a user device. The method may be for opening a new account. The method may comprise presenting a website served by a third-party computing system. The website may be presented via one or more user interfaces configured to receive inputs from a user and/or provide outputs to the user. The one or more user interfaces may be part of the user device. The method may comprise accepting a selection indicating a user request for a new account. The selection may be accepted via the one or more user interfaces. The method may comprise initializing a frame in the website. The frame may enable private communications between the user and the service provider computing system. The frame may be an inline frame. The method may comprise accepting user data. The user data may be input by the user via the one or more user interfaces. The user data may be accepted via the frame. The method may comprise transmitting the user data to the service provider computing system. The user data may be transmitted privately. The user data may be transmitted privately so as to not reveal the user data to the third party computing system serving the website. The user data may be transmitted via the frame in the website. The method may comprise receiving a transmission indicating that the new account has been opened. The transmission may be received from the service provider computing system. The method may comprise presenting an indication that the new account has been opened. The indication may be presented to the user. The indication may be presented via the one or more user interfaces.

These and other features, together with the organization and manner of operation thereof, will become apparent from the following detailed description and the accompanying drawings.

DETAILED DESCRIPTION

Figure 1:
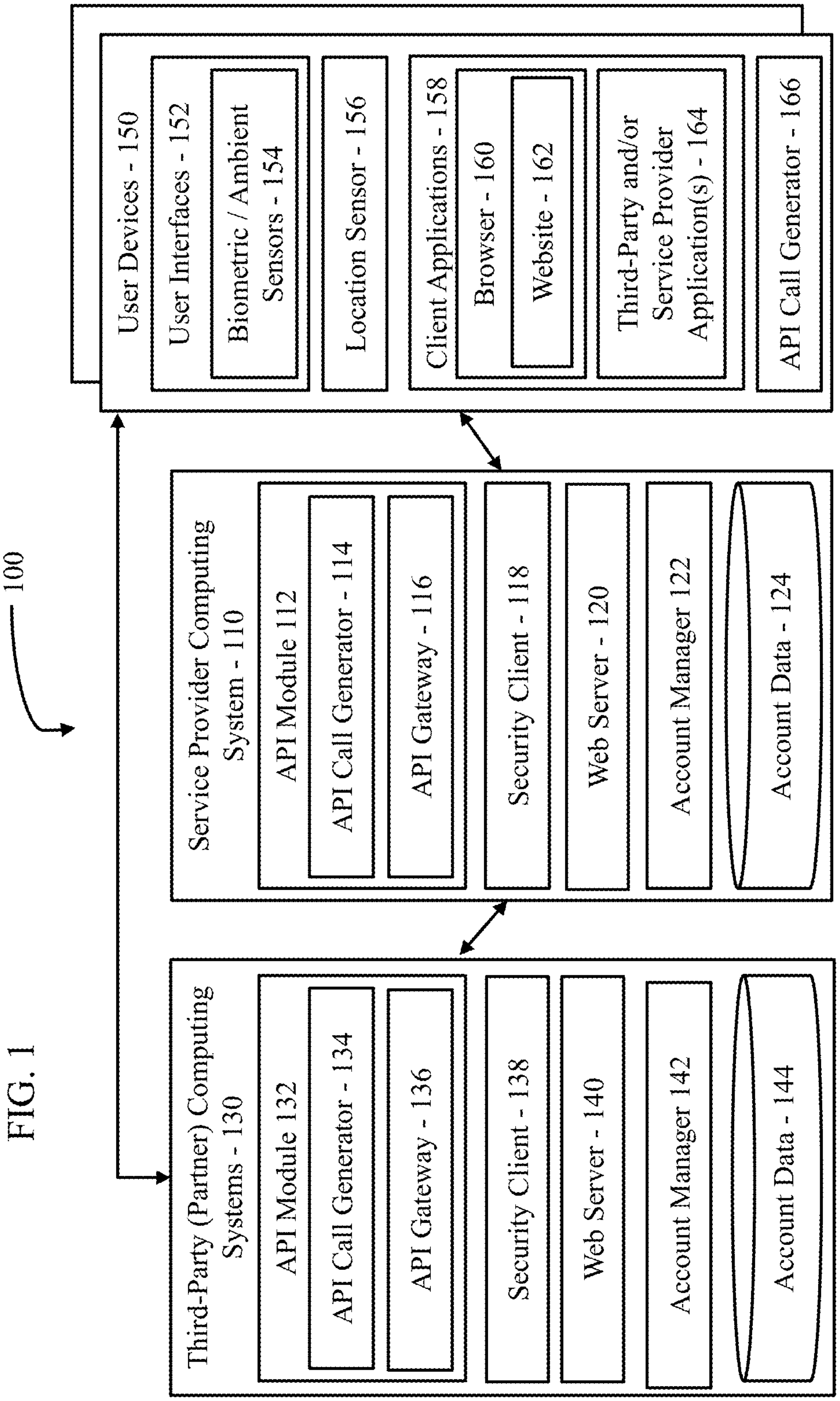
FIG. 1 is a block diagram of an example computer-implemented system, with a service provider system in communication with various systems and devices, according to potential embodiments.

Various embodiments described herein relate to systems and methods for providing, integrating, and/or using software development kits (SDKs) or components thereof to enable private and secure communications between a user device and a service provider computing system. As used herein, an SDK or devkit includes tools that facilitate the development of websites and applications that enable certain functionalities for one or more platforms. SDKs may include libraries and tools for interfacing with programming languages and embedded systems, sample code, technical notes, supporting documentation such as tutorials and manuals, etc. The SDK may be provided to a third-party/partner computing system for incorporation of various SDK components (e.g., executable code that may customizable, with libraries for display elements, communications, etc.) into a website and/or an application. The SDK may permit customization to allow the website or application to maintain control over certain aspects of the user experience. For example, the website or application may maintain control over perceptible elements (e.g., visually-perceptible elements such as logos, fonts, colors, and forms, as well as audible and haptic elements), and/or over the timing and triggers for initiation and/or termination of the communications between the user device and the service provider computing system. The user need not navigate to or launch another website or application to transact with the service provider computing system. The communications may be conducted via a frame (e.g., an inline frame, or "iframe") in the website and/or application, and the frame may be customized to appear as though it is an extension of the experience with the provider of the website or application. The disclosed approach may enhance frames using mechanisms that, for example, indicate the source and integrity of communications and thereby enhance their security and utility.

From the perspective of the user, the user experience can appear to be seamless, with the user continuing to interact with the same website or application before communications are initiated to allow the user to engage with the service provider computing system. The communications can be protected by security measures implemented by the SDK component, rather than the security measures of the website or application. For example, if the nature of the website or application only warrants a lower level of security for the communications between the user device and the third-party computing system, but the communications between the user device and the service provider computing system warrant a higher level of security, the higher level of security can be applied without requiring the third-party/partner to incorporate more stringent (and costly) security measures into its website or application. Because higher levels of security are more computationally intensive, reserving the more resource-intensive security measures for a limited subset of communications is more efficient.

Moreover, the third-party/partner need not develop a user interface that facilitates the communications between the user and the service provider computing system with the needed security and privacy. For example, if the user device communicates with the service provider computing system to allow the user to open or request a new account, the website or application need not provide the elements (e.g., selectable options, elements for indicating selections, descriptions of options, disclosures, etc.) needed for the functionality. A user seamlessly may transition between private and secure communications with the service provider computing system and communications with the third-party computing system. Once a user has concluded engaging with the service provider computing system to perform an action relevant to the user's engagement with the website or application, the service provider computing system may provide the third-party computing system with any relevant information or data it is authorized to provide, such as account numbers, confirmations, etc.

Referring to FIG. 1, a block diagram of an example system 100 enabling secure communications between a user device and a service provider computing system via a third-party website or application with little or no impact on the user experience, according to potential embodiments, is shown. The system 100 includes a service provider system 110 (e.g., a system of a financial institution or other service provider), which may be implemented using one or more computing devices. The system 100 may also include one or more third-party computing systems (also referred to as partner computing systems) 130 (e.g., a system of a merchant, vendor, or partner of the service provider), and one or more user devices 150. The components of the system 100 may be communicably and operatively coupled to each other over a network that permits the direct or indirect exchange of data, values, instructions, messages, and the like (represented by the double-headed arrows in FIG. 1).

Each system or device in system 100 may include one or more processors, memories, network interfaces, and user interfaces. The memory may store programming logic that, when executed by the processor, controls the operation of the corresponding computing system or device. The memory may also store data in databases. The network interfaces allow the computing systems and devices to communicate wirelessly or otherwise. The various components of devices in system 100 may be implemented via hardware (e.g., circuitry), software (e.g., executable code), or any combination thereof.

Service provider computing system 110 may comprise an API module 112 that includes an API call generator 114 to generate API calls to other systems or devices, and an API gateway 116 to allow other systems and devices to interact with service provider computing system 110 via various APIs, such as APIs that facilitate authentication, validation, data retrieval, etc. Similarly, third-party computing systems 130 may comprise an API module 132 that includes an API call generator 134 to generate API calls to other systems or devices, and an API gateway 136 to allow other systems and devices to interact with third-party computing systems 130 via various APIs. The service provider computing system 110 and the third-party computing systems 130 may provide various functionality to other devices through APIs. Generally, an API is a software-to-software interface that allows a first computing system of a first entity to utilize a defined set of resources of a second (external) computing system of a second (third-party) entity to, for example, access certain data and/or perform various functions. In such an arrangement, the information and functionality available to the first computing system is defined, limited, or otherwise restricted by the second computing system. To utilize an API of the second computing system, the first computing system may make an API call to the second computing system. The API call may be accompanied by a security or access token (e.g., a session token) or other data to authenticate the first computing system and/or a particular user. The API call may also be accompanied by certain data/inputs to facilitate the utilization or implementation of the resources of the second computing system, such as data identifying users, accounts, dates, functionalities, tasks, etc.

In system 100, service provider computing system 110 may accept or receive API calls via API gateway 116, and third-party computing systems 130 may accept or receive API calls via API gateway 136. Requests/transmissions from service provider computing system 110 to third-party computing systems 130 may be in the form of API calls generated via API call generator 114, and requests/transmission from third-party computing systems 130 to service provider computing system 110 may be in the form of API calls generated via API call generator 134. API modules 112 and 132 may utilize APIs to communicate with other devices and systems and provide various functionality, sending and receiving different API calls on a regular basis or on an as-needed basis. The API calls may include or be accompanied by various data, such as account numbers and security tokens to authenticate the API call, provide information needed to perform a function, etc.

Service provider computing system 110 may include a security client 118 which may provide fraud prevention measures and security protections (such as generation of security tokens, authentication of devices, verification of biometric or other security data, etc.). The service provider system 110 may also include a web server 120 for serving websites to client devices, and an account manager 122 that may generate, update, and maintain account data 124 for users and third-parties in one or more databases. Similarly, third-party computing systems 130 may include a security client 138 which may provide fraud prevention measures and security protections, a web server 140 for serving websites to client devices, and an account manager 142 that may generate, update, and maintain account data 144 for users and third-parties in one or more databases. Account data 124, 144 may include, for example, personally identifiably information (PII), account numbers for financial accounts (in association with the entities to which the accounts belong), and may be populated, at least in part, using data acquired via service provider computing system 110, third-party computing systems 130, and/or user devices 150.

User devices 150 may include one or more user interfaces 152, which may include one or more biometric sensors/ambient sensors 154. User interfaces 152 may include components that provide perceptible outputs (e.g., displays and light sources for visually-perceptible elements, a speaker for audible elements, and haptics for perceptible signaling via touch), that capture ambient sights and sounds (such as cameras and microphones), and that allow the user to provide inputs (e.g., a touchscreen, stylus, force sensor for sensing pressure on a display screen, and biometric components such as a fingerprint reader, a heart monitor that detects cardiovascular signals, an iris scanner, and so forth). One or more user devices 150 may include one or more location sensors 156 to enable the user device 150 to determine its location relative to, for example, other physical objects or relative to geographic locations. Example location sensors 156 include global positioning system (GPS) devices and other navigation and geolocation devices, digital compasses, gyroscopes and other orientation sensors, as well as proximity sensors or other sensors that allow the user device 150 to detect the presence and relative distance of nearby objects and devices.

The user devices 150 may include client applications 158, such as an Internet browser 160 presenting websites 162 (or components thereof executing on user device 150), and applications 164 provided or authorized by the entity implementing or administering the service provider system 110 and/or by the entity implementing or administering the third-party computing systems 130. The user devices 150 may also include an API call generator 166 for generating API calls to other devices and systems, such as the service provider computing system 110 and/or the third-party computing systems 130.

Figure 2:
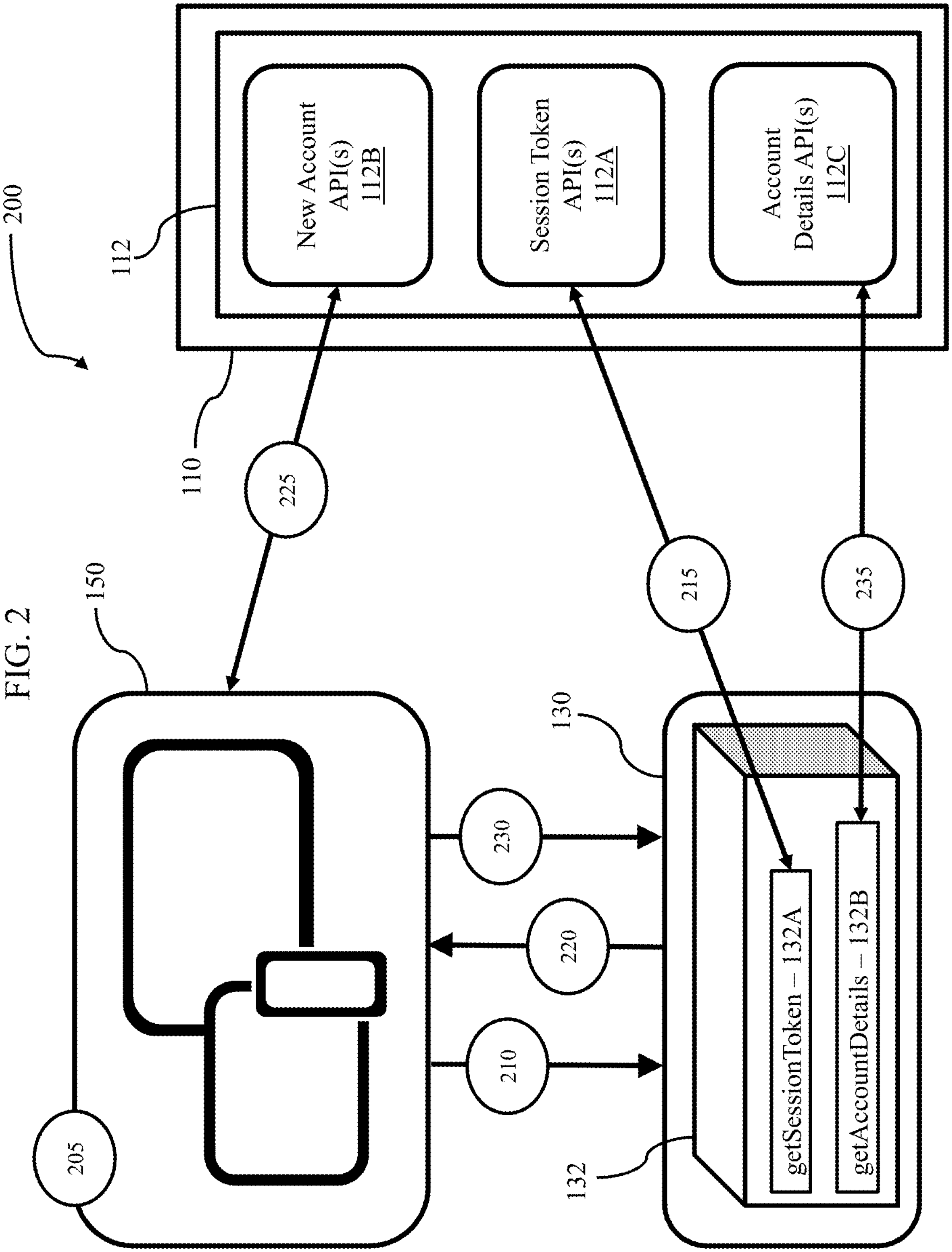
FIG. 2 depicts an example approach for SDK integration, according to potential embodiments.

FIG. 2 provides an overview of an example SDK integration flow 200 involving a user device 150, third-party computing system 130, and a service provider computing system 110, according to potential embodiments. As further discussed below, the user device 150 (and the website, application, and/or SDK component running thereon) is involved with a "front end" of the architecture, the third-party computing system 130 is involved with a "back end" of the architecture. At 205, a website 162 or application 164 running on user device 150 initializes an SDK component incorporated into the website 162 or application 164. At 210, the SDK component transmits a request to the third-party computing system 130. In various implementations, the request may be, for example, an HTTP request, such as an Asynchronous Javascript And XML (AJAX) call, or may be an API call.

At 215, the third-party computing system 130 transmits (e.g., via API module 132) an API call (e.g., a "getSessionToken" API call 132A) to the service provider computing system 110 to request an SDK session token. The API call may be received via one or more session token APIs 112A of the API module 112 of the service provider computing system 110. In response, the service provider computing system 110 may return an SDK session token to the third-party computing system 130. At 220, the third-party computing system 130 may transmit the SDK session token to the user device 150, and specifically, to the SDK component running thereon.

Using the session token, the SDK component facilitates communications between the user device 150 and the service provider computing system 110 at 225. During the communications, the user may input, via user interfaces 152, entries into fields requesting information relevant to, for example, a request for a new account. The SDK component may provide user inputs to the service provider computing system 110 via one or more API calls. The API calls may be received via one or more new account APIs 112B of the API module 112 of the service provider computing system 110.

In some implementations, the service provider computing system 110 (e.g., API module 112) may assign an identifier to the communication session or a transaction conducted during the communications session, and transmit the identifier ID to the SDK component. In certain implementations, the SDK component may assign the identifier and transmit the identifier to the service provider computing system 110. If the user applied for a new account, for example, the identifier may be an application ID assigned to an application for the new account.

At 230, the SDK component may transmit the identifier to the third-party computing system 130. At 235, the third-party computing system 130 transmits an API call (e.g., a "getAccountDetails" API call 132B) to the service provider computing system 110 to request details of the new account, such as an account number. The API call may be received via one or more account details APIs 112C of the API module 112 of the service provider computing system 110. In response, the service provider computing system 110 may return the account number or other details to the third-party computing system 130. The third-party computing system 130 may then, for example, use the account details (e.g., a credit card number) for a transaction with the user (e.g., a purchase with the newly-opened credit card account).

Figure 3:
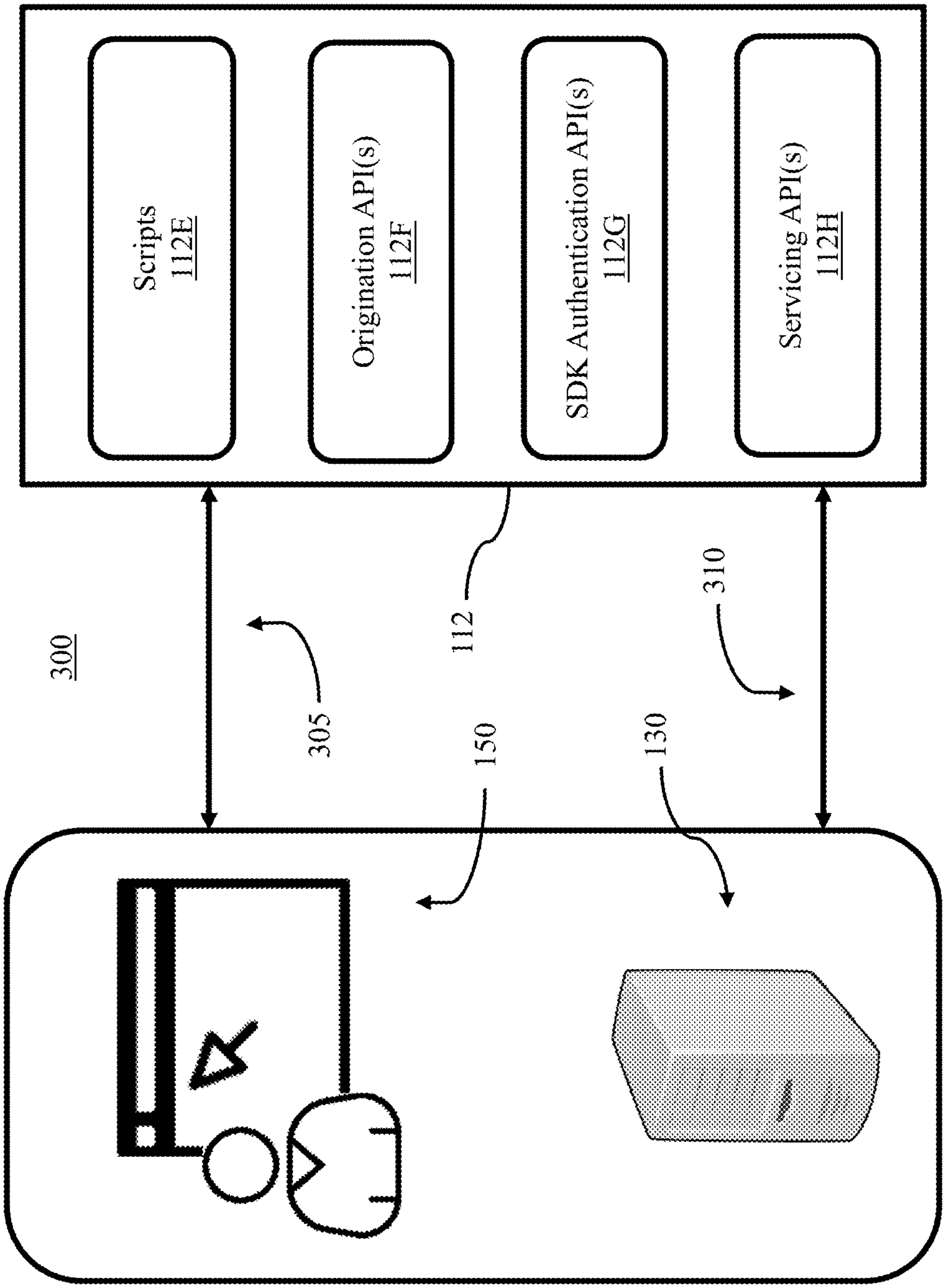
FIG. 3 depicts an overview of an example SDK architecture, according to potential embodiments.

Referring to FIG. 3, an overview of an example SDK architecture 300 according to potential embodiments is presented. Architecture 300 includes a front-end channel 305 and a back-end channel 310. The front-end channel involves a client application 158 (e.g., website 162, third-party application 164, and/or SDK component 165) making API or other calls to the API module 112 (e.g., API gateway 116) of service provider computing system 110. The front-end channel 305 involves elements that are "in front of" the user via applications 158 running on user device 150. The back-end channel 310 involves the third-party computing system 130, such as web server 140 which serves website 162 to the user device 150 and API module 132 which can make API calls to the service provider computing system 110. The API module 112 includes, for example, one or more scripts 112E, origination APIs 112F, SDK authentication APIs 112G, and servicing APIs 112H.

Figure 4:
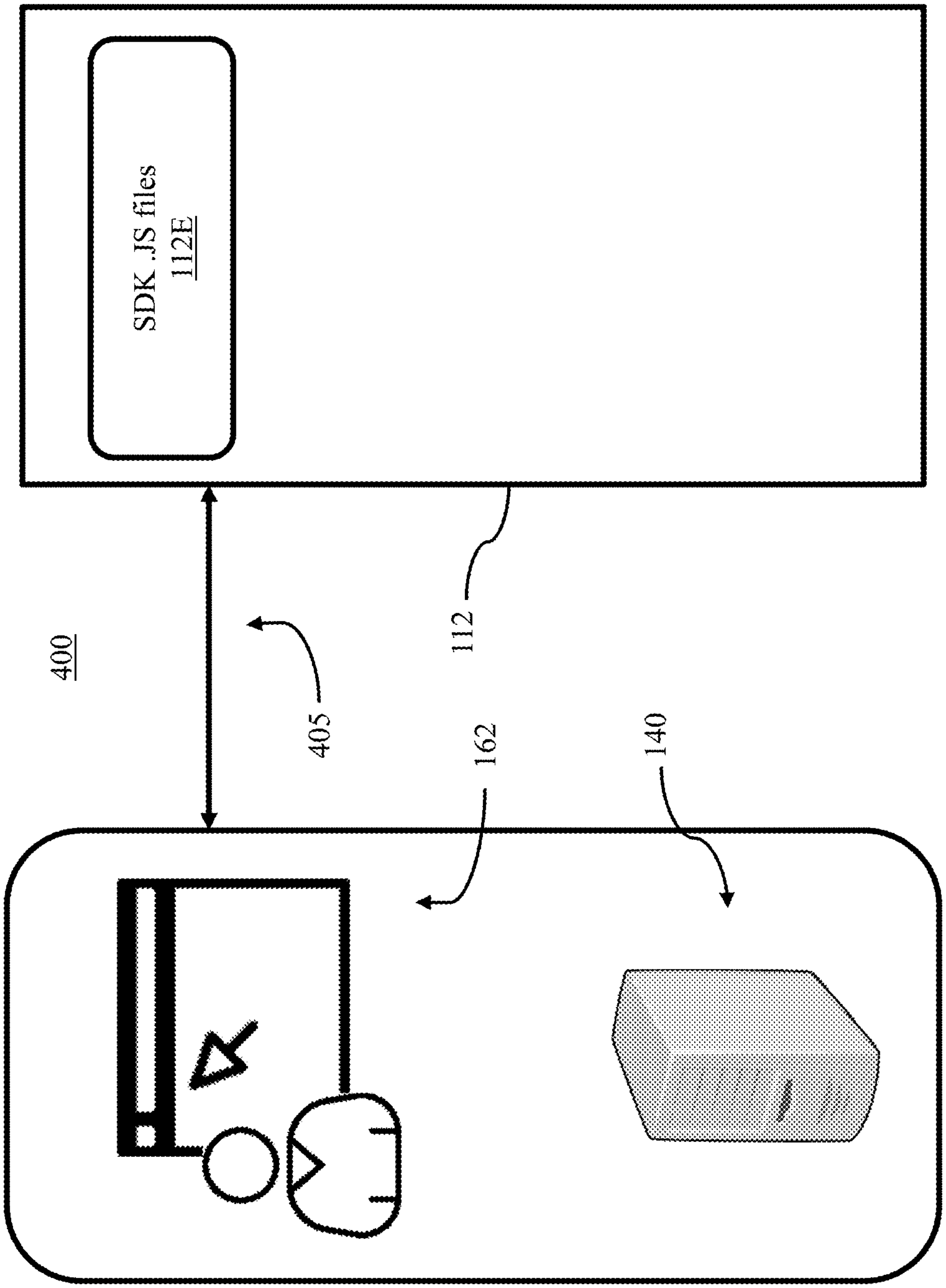
FIG. 4 depicts an example SDK initialization approach, according to potential embodiments.

Referring to FIG. 4, an example SDK initialization/bootstrapping flow according to potential embodiments is presented. The front-end channel 405 involves web server 140 serving third-party website 162 to the user device 150. The website 162 pulls one or more scripts 112E, such as an SDK .JS file, which can be executed by the website 162 to configure and initialize the SDK component. The SDK bootstrapping 400 may occur after a selection, detected via user interfaces 152 of user device 150, indicating that private communications between the user device 150 and the service provider computing system 110 are to be conducted. In some implementations, the selection may correspond with a desire to open a new account, engage in a transaction, provide documents or information, or otherwise communicate with the service provider computing system 150.

In various implementations, the request for script 112E may be made via an API call, or in another way. The request may include a unique identifier that may be generated, for example, by the service provider computing system 110 upon registration by the third-party computing system 130 for the SDK, incorporation of the SDK component into the website 162 or third-party application 164, or at another time. The request for script 112E also allows the service provider computing system 110 to anticipate communications with the user device 150. The unique identifier may help the service provider computing system 110 identify the third-party computing system 130 and the potential nature of the communications with the user device 150.

Figure 5:
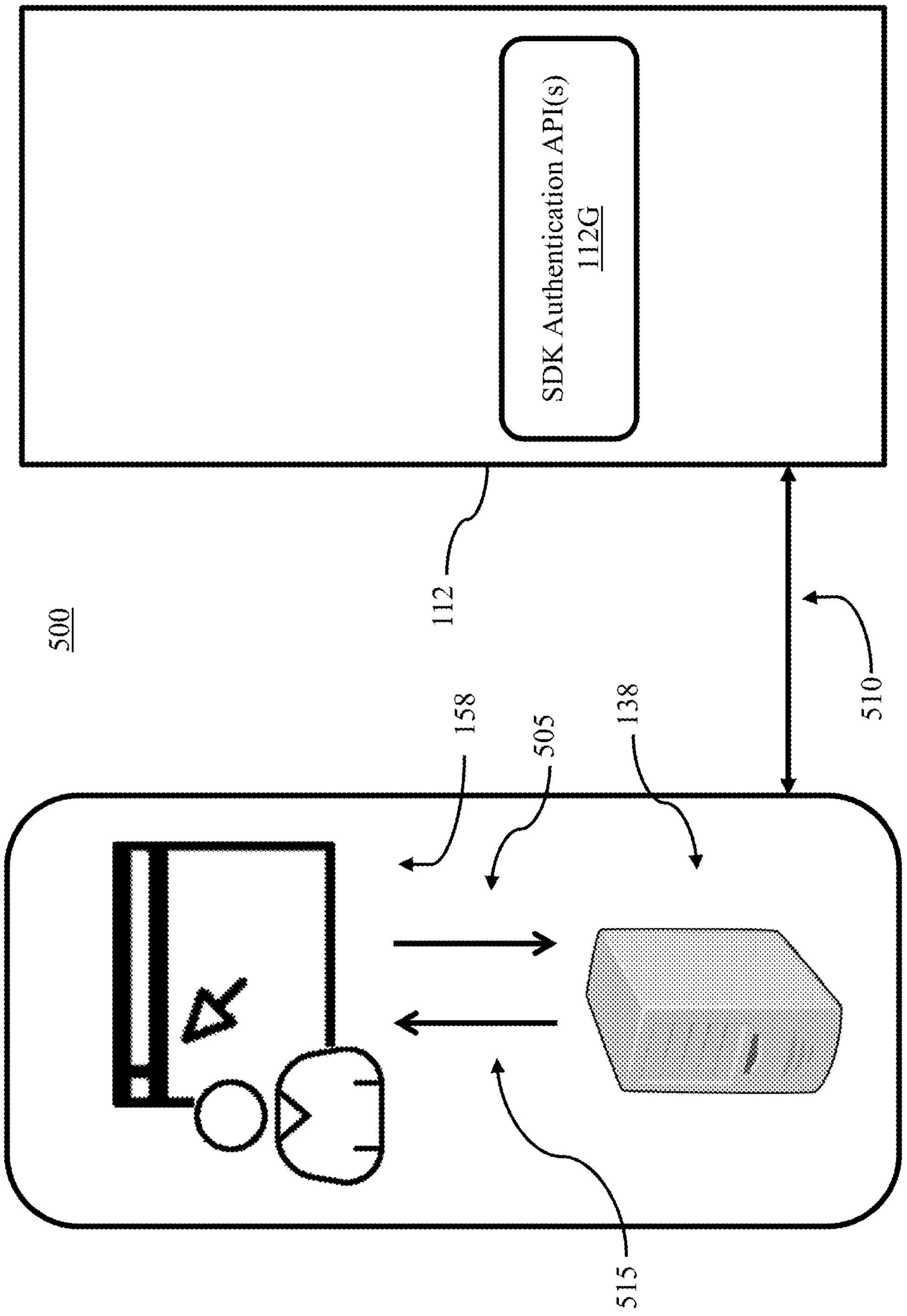
FIG. 5 is an example approach for authentication of a third-party computing system, according to potential embodiments.

Referring to FIG. 5, an example third-party authentication flow 500 according to potential embodiments is presented. The SDK component may transmit (505) a request to the third-party computing system 130 (e.g., to web server 140 or API gateway 136) for an SDK session token. In various implementations, the request may be an HTTP request, such as an AJAX call, or an API call. Via back-end channel 510, third-party computing system 130 (via, e.g., security client 138 or API module 132) may transmit a request for an SDK session token to the service provider computing system 110 (which may receive the request via, e.g., security client 118 or API module 112). The API calls may be received via, for example, one or more SDK authentication APIs 112G of the API gateway 116 of the service provider computing system 110. The one or more SDK authentication APIs 112G (or other APIs of gateway 116) may unpack the SDK session token to authenticate the third-party website 162. The service provider computing system 110 may return, via back-end channel 510, an SDK session token to the third-party computing system 130, which may transmit (515) the SDK session token to the SDK component. In some embodiments, the session token may be generated by the service provider computing system 110 so as to have time restrictions, such that the session token expires after a predetermined time (e.g., 15, 30, or 90 minutes), the session token must be used for start of communications within a predetermined time (e.g., within 5 or 10 minutes), and/or the session token times out (e.g., due to non-use) after a predetermined amount of time (e.g., 5 minutes or 15 minutes).

Figure 6:
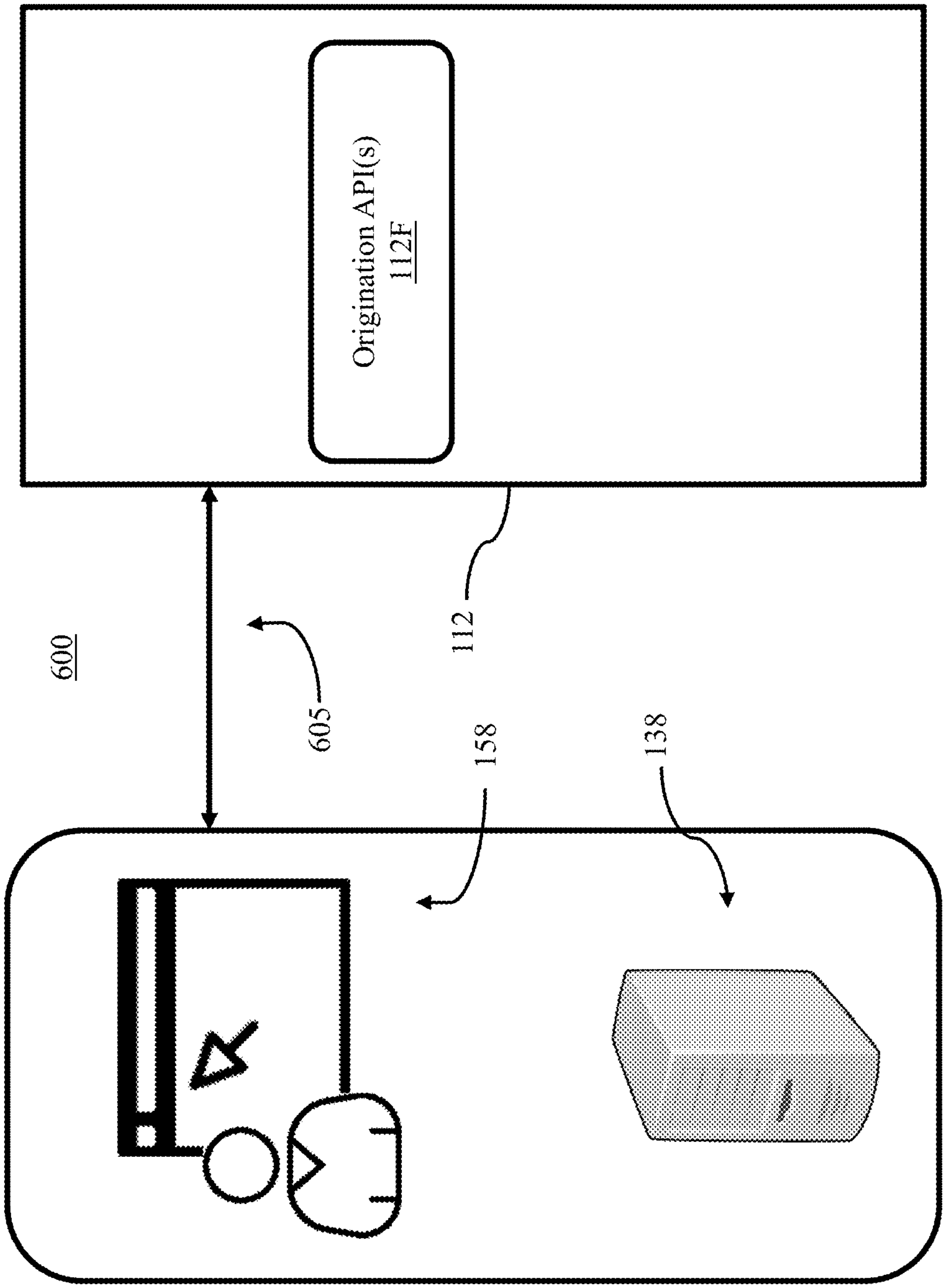
FIG. 6 is an example approach for account origination via API calls, according to potential embodiments.

Referring to FIG. 6, an example account origination flow 600 according to potential embodiments is presented. With the SDK session token transmitted to the SDK component, the SDK component may initiate and engage in private and secure communications between the user device 150 and the service provider computing system 110. In various implementations, the SDK component may use a frame, such as an iframe, in website 162 for the communications. For example, website 162 may specify a placeholder, which the SDK component may use to insert an iframe. The SDK component may retrieve and submit data via API calls. For example, information input by the user (e.g., input into a frame via user interfaces 152) may be passed to the service provider computing system 110 via API calls to the API gateway 116 of the service provider computing system 110. If the purpose of the communications is to open a new account via the service provider computing system 110, the SDK component may pass application data (i.e., user entries into an application form) for the new account via API calls. The API calls may be received via, for example, one or more origination APIs 112F of the API gateway 116 of the service provider computing system 110. In response, the API module 112 may provide information to the SDK component, such as an approval decision, confirmation, etc.

Figure 7:
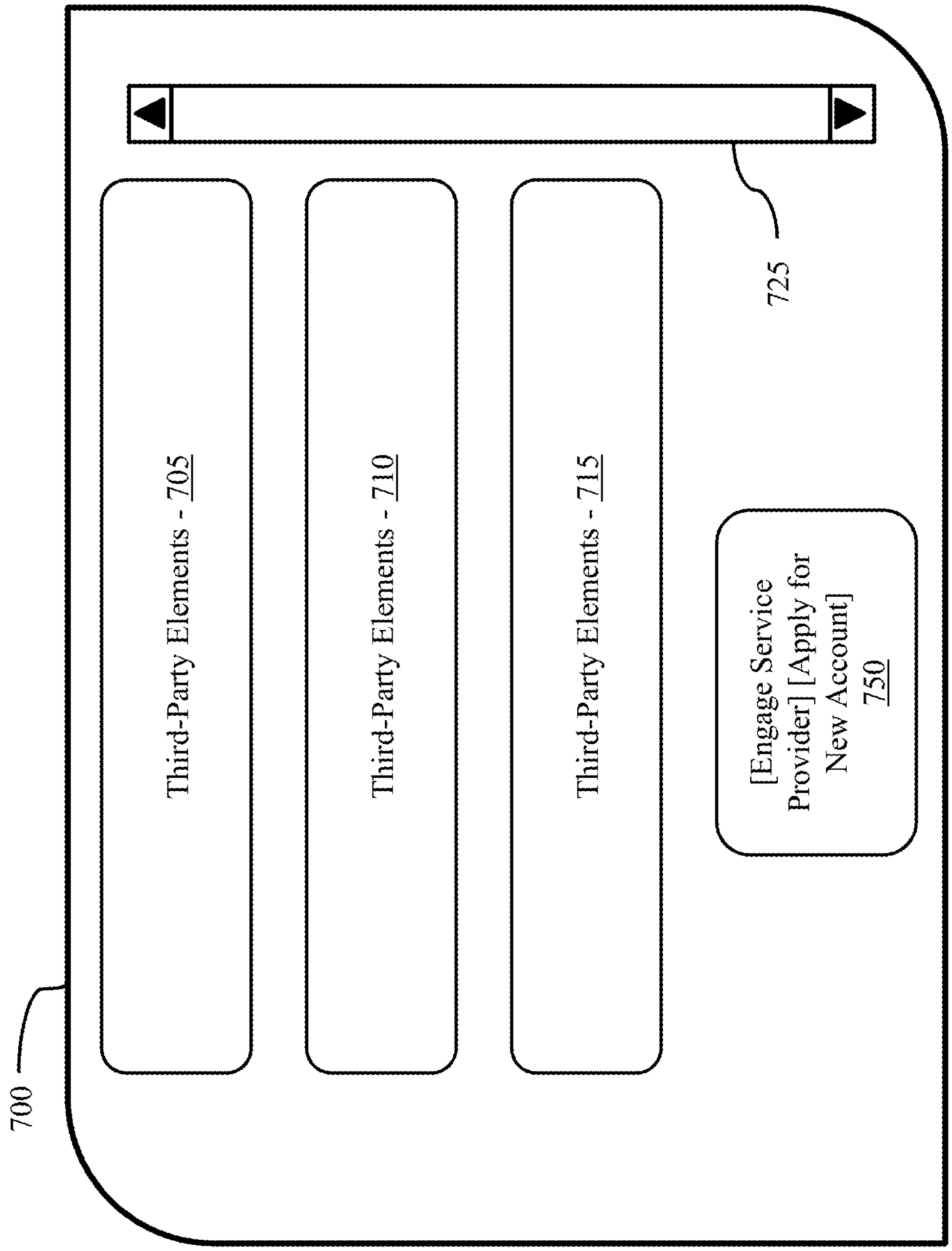
FIG. 7 depicts an example user interface of a website or application that integrates an SDK from a service provider computing system, before initiation of an SDK component, according to potential embodiments.

Referring to FIG. 7, an example website/application user interface 700 according to potential embodiments is presented. The user interface 700 may be presented via, for example, an ecommerce website 162 of a third-party merchant. As depicted in FIG. 7, the example user interface 700 includes third-party elements 705, 710, 715, which may be graphical elements that provide and/or request information, such as text, images, selectors, etc. In some implementations, the third-party elements 705, 710, 715 may present, at least in part, items available for purchase. Third-party elements 705, 710, 715 may also include, for example, logos of the third-party merchant. A scroll bar 725 may allow the user to scroll the page to reveal additional elements not currently viewable.

In some screens, where relevant to the interaction between the user device 150 and the third-party computing system 130, user interface 700 may present an activatable link 750 to allow the user to indicate, via one or more user interfaces 152 (e.g., by touching a touchscreen), a desire to engage with the service provider computing system 110. The user may wish to engage with the service provider computing system 110 to, for example, apply for a new account, such as a credit card (e.g., a private label credit card or account cobranded by the service provider and the third party) or other account. Upon detecting that link 750 has been activated via the user interfaces 152, the SDK component may be initialized (via, e.g., website 162) as discussed above.

Figure 8:
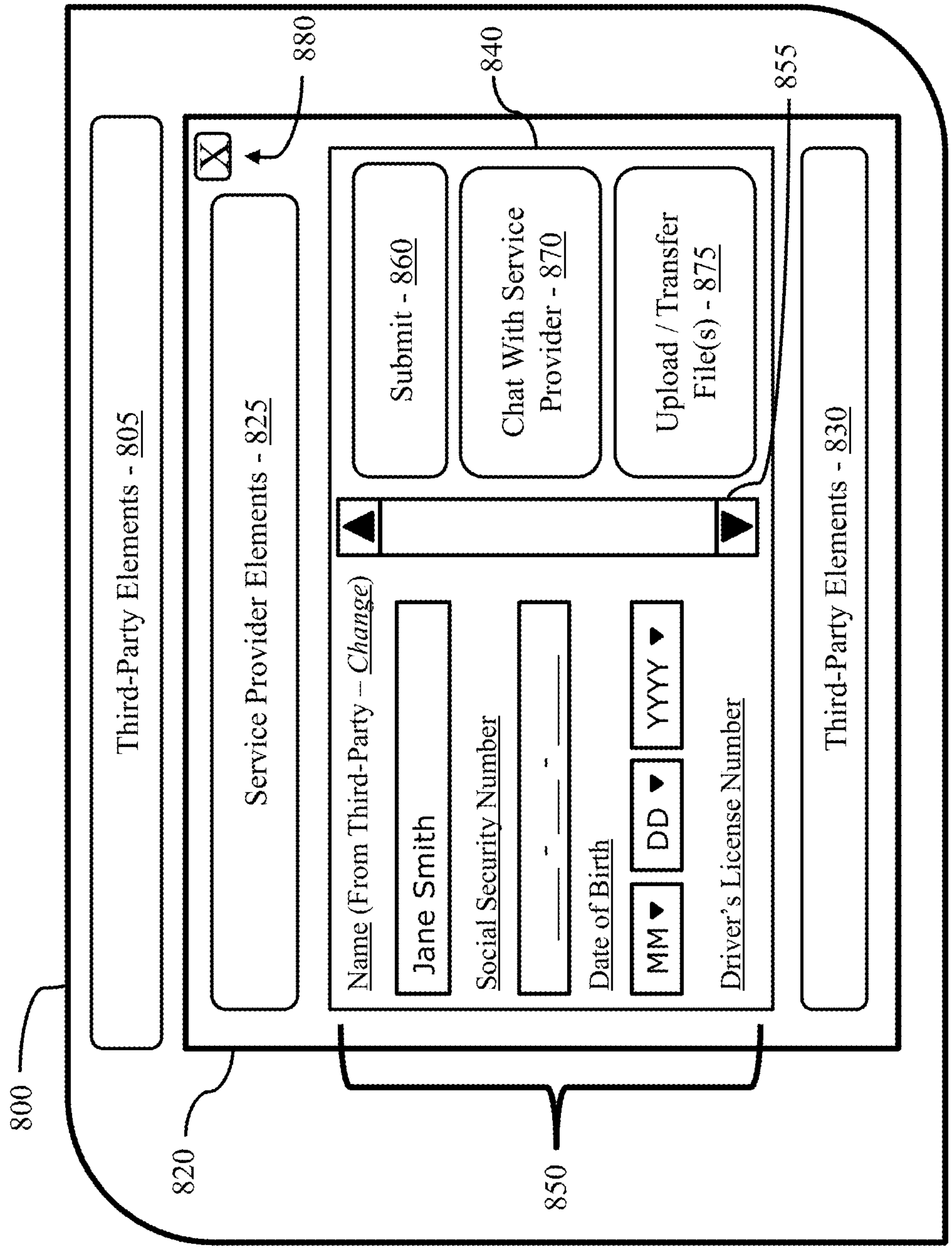
FIG. 8 depicts an example user interface of a website or application that integrates an SDK from a service provider computing system, following initiation of an SDK component, according to potential embodiments.

Referring to FIG. 8, an example user interface 800 enabling live communications between the user device 150 and the service provider computing system 110 according to potential embodiments is presented. The user interface 800 may be presented via, for example, an ecommerce website of a third-party merchant. The user interface 800 as depicted in FIG. 8 includes third-party elements 805 under the control of the third-party website. User interface 800 also include an iframe 820 generated by the SDK component. In some implementations, the iframe 820 may include service provider elements 825, such as a logo of the service provider associated with the service provider computing system 110. When incorporating the SDK component, the third-party computing system 130 allows for customization of certain elements of the iframe. Consequently, although the website 162 and/or application 164 may be blind to some or all of the information in iframe 820 (e.g., the SDK component does not share entries in iframe 820 with the third-party website 162/application 164 or with the third-party computing system 130), the iframe 820 may include third-party elements 830 that may have been selected or provided via third-party computing system 130 during customization of the SDK. In certain implementations, iframe 820 may be segmented into multiple smaller frames or portions, such as active portion 840 with, for example, a form 850 that includes fields into which the user may input information requested for use by the service provider computing system 110 in, for example, opening a new account. Certain fields may be prepopulated using data received from the website 162/application 164 and/or from the third-party computing system 130 and/or based on context (e.g., a presumption about a desired option based on prior selections or entries). If so, the form 850 may allow the user to select a link (e.g., corresponding with "Change" in form 850) to modify the prepopulated data. This allows the user to, for example, change an imported name, which might be a nickname used at the ecommerce website 162 and/or application 164, to a legal name needed to apply for a new credit card. In some implementations, once the user has completed the form, the user may select activatable link 860 to submit the application for the new account.

In various embodiments, iframe 820 may, alternatively or additionally, include other/additional functionality. For example, as can be seen in FIG. 8, iframe 820 can provide an opportunity for a live or automated chat with the service provider computing system 110 via chat link 870. In certain embodiments, iframe 820 may alternatively or additionally provide an activatable upload/transfer files icon 875 to allow the user to upload or transfer files (e.g., documents in PDF or word processing formats, images, videos, audio, security tokens, etc.). Upon activation of icon 875, the SDK component may allow the user to, for example, browse one or more folders on the user device 150 to select one or more local files, select one or more applications (e.g., cloud storage) to select one or more remote files, or otherwise identify files to be uploaded or transferred, directly or via iframe 820, to the service provider computing system 110. If the user wishes to terminate the communication (e.g., before the session is automatically terminated via the SDK component), the user may select a close-frame icon 880.

Figure 9:
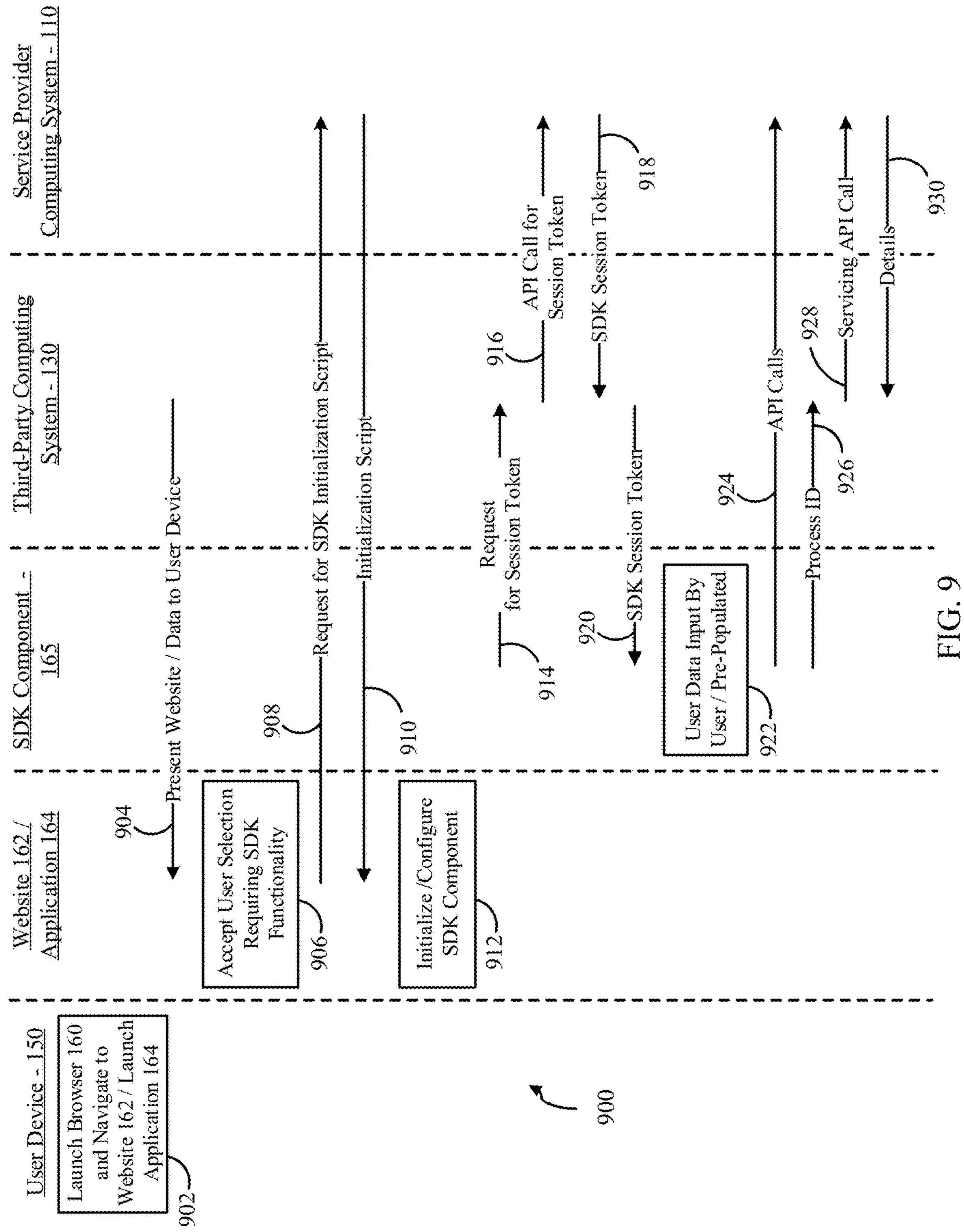
FIG. 9 depicts an example process flow for use of a user interface of a website or application that integrates an SDK of a service provider computing system, according to potential embodiments.

Referring to FIG. 9, an example process flow 900 according to potential embodiments is presented. At 902, the user device 150 may receive, via one or more user interfaces 152, a user input for launching browser 160 and navigating to third-party website 162. In various embodiments, an application 164 is additionally or alternatively launched based on the user input. At 904, the third-party computing system 130 (e.g., via web server 140) serves the website and/or application data to the user device 150, allowing the user device 150 to exchange information with the third-party computing system 130. At 906, while using the website 162 and/or application 164, the website 162 and/or application 164 may accept a user input corresponding with a selection (e.g., detecting activation of link 750 in FIG. 7) to perform a function that involves engaging or otherwise communicating with the service provider computing system 110. The function may be, for example, opening a new account, uploading/transferring official documents, accepting certain disclosures from the service provider computing system 110 and confirming receipt thereof, etc. At 908, the website 162 and/or application 164 may transmit to the service provider computing system 110 a request for an SDK initialization script 112A (the SDK bootstrap). At 910, the service provider computing system 110 may transmit script 112A to the website 162 and/or application 164. At 912, the website 162 and/or application 164 may execute the script 112A to initialize and configure the SDK component 165.

At 914, the SDK component 165 (now initialized) may transmit to the third-party computing system 130 a request, such as an HTTP request, for an SDK session token. At 916, the third-party computing system 130 may transmit to the service provider computing system 110 an API call for the SDK session token. At 918, the service provider computing system 110 may transmit the SDK session token to the third-party computing system 130, and at 920, the third-party computing system may transmit the SDK session token to the SDK component 165. The SDK component 165 requesting the SDK session token via the third-party computing system 130 (rather than directly from the service provider computing system 110) can provide an added layer of security and allow the third-party computing system 130 to be aware of the impending communications between the user device 150 and the service provider computing system 110. In alternative embodiments, the user device 150 may request the SDK session token directly from the service provider computing system 110.

At 922, with the SDK session token, the SDK component 165 may exchange information privately and securely with the user. The user may, for example, provide application data to open a new account, provide documents or other files, make selections, confirm data, etc. At 924, information is exchanged with the service provider computing system 110 via API calls by the SDK component 165 to the service provider computing system 110. The API calls may be received via, for example, one or more new account APIs 112B of the API gateway 116 of the service provider computing system 110. Information from user device 150 may accompany the API calls, and the service provider computing system 110 may provide information as part responses to the API calls transmitted by the service provider computing system 110 to the SDK component 165. Information may include application data, documents, etc., and response may include an approval decision to be presented to the user via the SDK component 164. Once the session is terminated (e.g., at completion of a function and/or by closing of frame 820 via close-frame icon 880), the SDK component 165 may transmit a process identifier to the third-party computing system 130 at 926. The process identifier may be generated by the SDK component and/or by the service provider computing system 110. The process identifier may, for example, be an application ID that uniquely identifies an application for a new account, may provide confirmation that a task was completed, may indicate termination of the session, etc.

At 928, the third-party computing system 130 may transmit a servicing API call to the service provider computing system 110. The servicing API call may be accompanied by the application ID or other identifier received at 926. The servicing API call may be received via, for example, one or more servicing APIs 112H of the API gateway 116 of the service provider computing system 110. In response to the servicing API call, the service provider computing system 110 may transmit certain details to the third-party computing system 130. The details may include information relevant to the transaction between the third-party computing system 130 and the user device 150. That is, the details may include limited information pertaining to the user related to the purpose for which the communications between the user device 150 and the service provider computing system 110 were initiated. For example, if communications between the user device 150 and the service provider computing system 110 were initiated for the purpose of opening a new account to be used in a transaction with the third-party computing system 130, the details may be (or may include) an account number, such as a credit card number. The third-party computing system 130 may then use the details to proceed with its interaction with the user device 150, such as charging a purchase to an approved and newly-opened credit card. In some implementations, the credit card may be issued by a service provider that is a financial institution, and may be cobranded with a third-party that is a merchant or vendor.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented by a partner computing system, the method comprising:

receiving, via a software component running on a user device accessing a website, a request for a session token;

transmitting an authentication API call to a service provider computing system to request the session token;

receiving, in response to the authentication API call, the session token from the service provider computing system; and providing the session token to the software component to enable authenticated communications directly between the user device and the service provider computing system;

wherein the software component facilitates authenticated private communications between the user device and the service provider computing system via a frame in the website.

2. The method of claim 1, wherein the request is an HTTP request.

3. The method of claim 1, wherein the request is generated by the software component in response to a user input submitted to the website.

4. The method of claim 1, wherein the frame is an inline frame in the website, and wherein the software component maintains privacy by sharing user entries into the inline frame with neither the website nor the partner computing system.

5. The method of claim 1, wherein the website initializes the software component at least in part by retrieving and executing a script from the service provider computing system.

6. The method of claim 1, wherein the website is an ecommerce website, wherein the method further comprises accepting via the website an identification of one or more items selected by the user, and wherein a user input submitted to the website indicates a request to open a new account via the service provider computing system for use in purchasing the one or more items selected via the website.

7. The method of claim 1, wherein the software component runs on the user device once the software component is initialized by the website.

8. The method of claim 7, wherein the software component is initialized upon execution of a script retrieved by the website from the service provider computing system.

9. The method of claim 1, further comprising receiving, via the software component, an application ID, and transmitting a servicing API call to the service provider computing system, the servicing API call including the application ID.

10. The method of claim 9, wherein the application ID is associated with an account request submitted to the service provider computing system via the software component, wherein the software component makes API calls to the service provider computing system to provide the service provider computing system with user entries into fields in the account request.

11. The method of claim 9, further comprising receiving, in response to the servicing API call, an account number from the service provider computing system.

12. The method of claim 11, wherein the partner computing system is administered by an online merchant, wherein the account number is a credit card account number, and wherein the method further comprises charging a purchase by the user to the credit card.

13. The method of claim 1, wherein the software component is an SDK component, the method further comprising receiving the SDK component from the service provider computing system, and incorporating the SDK component in the website.

14. The method of claim 13, wherein the SDK component facilitates authenticated private communications via a frame in the website, wherein the SDK component is configured to permit customization of the frame, and wherein the method further comprises accepting one or more user customizations of the frame.

15. The method of claim 14, wherein the one or more user customizations comprise selections of third-party elements to be presented in the frame.

16. A method implemented by a partner computing system, the method comprising:

receiving, from a service provider computing system, a software component which facilitates secure communication between a user device and the service provider computing system via a first frame in a website;

receiving, via the software component running on the user device accessing the website, a request for a session token in response to a user input submitted via the user device;

obtaining the session token from the service provider computing system via an authentication API call transmitted to the service provider computing system to request the session token; and providing the session token to the software component to allow the user to have authenticated private communications with the service provider computing system via the first frame or a second frame, wherein at least one of the first frame or the second frame is an inline frame in the website.

17. The method of claim 16, wherein the website is an ecommerce website, wherein the method further comprises accepting via the website an identification of one or more items selected by the user, wherein the method further comprises:

receiving an application ID from the software component;

making a servicing API call to the service provider computing system, the servicing API call including the application ID;

in response to the API call, receiving a credit card number from the service provider computing system; and charging the one or more selected items to the credit card.

18. The method of claim 16, wherein the software component is an SDK component, the method further comprising:

accepting one or more user selections of third-party elements to be presented in the inline frame;

incorporating a customized SDK component into the website; and presenting information to the user device via the website incorporating the customized SDK component.

19. A partner computing system comprising a network interface configured to communicate via a telecommunications network, and one or more processors, the partner computing system configured to:

present, to a user device, information via a website that utilizes a software component to facilitate secure and private communication between the user device and a service provider computing system, wherein the software component facilitates authenticated private communications between the user device and the service provider computing system via a frame in the website;

receive, via the software component running on the user device accessing the website, a request for a session token, the software component having generated the request in response to a user input submitted to the website;

transmit an API call to the service provider computing system to request the session token;

receive, in response to the API call, the session token from the service provider computing system; and transmit the session token to the user device to enable authenticated communications directly between the user device and the service provider computing system via the software component.

* * * * *